United States Patent
Takafuji

(10) Patent No.: US 7,782,180 B2
(45) Date of Patent: Aug. 24, 2010

(54) COLLISION-DETECTING DEVICE FOR AUTOMOTIVE VEHICLE

(75) Inventor: Tetsuya Takafuji, Anjo (JP)

(73) Assignee: Denso Corporation, Kariya (JP)

( * ) Notice: Subject to any disclaimer, the term of this patent is extended or adjusted under 35 U.S.C. 154(b) by 268 days.

(21) Appl. No.: 12/082,805

(22) Filed: Apr. 14, 2008

(65) Prior Publication Data

US 2008/0316008 A1    Dec. 25, 2008

(30) Foreign Application Priority Data

Jun. 19, 2007    (JP)    ............................. 2007-161735

(51) Int. Cl.
    *B60Q 1/00*      (2006.01)
(52) U.S. Cl. .................... 340/436; 340/425.5; 340/908
(58) Field of Classification Search ................ 340/436, 340/425.5, 901–908, 925, 927, 935, 438–441, 340/443, 435, 454, 459
See application file for complete search history.

(56) References Cited

U.S. PATENT DOCUMENTS

| | | | | |
|---|---|---|---|---|
| 4,249,632 | A * | 2/1981 | Lucchini et al. | 180/274 |
| 5,934,743 | A * | 8/1999 | Nohr et al. | 296/187.06 |
| 7,137,472 | B2 * | 11/2006 | Aoki | 180/274 |
| 7,441,828 | B2 * | 10/2008 | Noyori et al. | 296/187.04 |
| 7,575,271 | B2 * | 8/2009 | Hasegawa et al. | 296/187.04 |
| 7,591,333 | B1 * | 9/2009 | Polz et al. | 180/69.2 |
| 2006/0087417 | A1 * | 4/2006 | Kiribayashi | 340/435 |
| 2007/0024069 | A1 * | 2/2007 | Takagi et al. | 293/102 |
| 2007/0181359 | A1 | 8/2007 | Mader | |
| 2007/0222236 | A1 | 9/2007 | Takahashi et al. | |
| 2007/0227797 | A1 | 10/2007 | Takahashi et al. | |

FOREIGN PATENT DOCUMENTS

| | | |
|---|---|---|
| JP | 11-208389 | 8/1999 |
| JP | 2004-284464 | 10/2004 |
| JP | WO 2005/098384 | 10/2005 |
| JP | 2006-117157 | 5/2006 |
| JP | 2007-261309 | 10/2007 |
| JP | 2007-290682 | 11/2007 |

OTHER PUBLICATIONS

Notice of Reasons For Rejection dated Feb. 3, 2009 in Japanese Application No. 2007-161735.

* cited by examiner

*Primary Examiner*—Daniel Previl
(74) *Attorney, Agent, or Firm*—Harness, Dickey & Pierce, PLC

(57) ABSTRACT

A collision-detecting device according to the present invention is installed in a bumper of an automotive vehicle. The collision-detecting device includes a deformable member disposed behind a bumper cover, a pressure sensor disposed in an inside space of the deformable member and an electronic control unit for determining a collision with a pedestrian based on signals from the pressure sensor. A width of the deformable member is made 300 mm or wider so that the width sufficiently covers a portion that is usually deformed by a collision with a pedestrian. A height of the deformable member is so set that a reaction force of the deformable member generated by a collision with a pedestrian does not exceed a predetermined level such as 1 kN. According to the present invention, a collision with a pedestrian is surely detected and the colliding pedestrian is protected from a severe damage.

8 Claims, 3 Drawing Sheets

$$F=[\{W/(W-0.2)\}^{1.4}\times 100-100]\times 0.1\times h \leq 1 \quad (W\&h:meter)$$

$F = [\{W/(W-0.2)\}^{1.4} \times 100 - 100] \times 0.1 \times h \leq 1$ (W&h:meter)

COLLISION-DETECTING DEVICE FOR AUTOMOTIVE VEHICLE

CROSS-REFERENCE TO RELATED APPLICATION

This application is based upon and claims benefit of priority of Japanese Patent Application No. 2007-161735 filed on Jun. 19, 2007, the content of which is incorporated herein by reference.

BACKGROUND OF THE INVENTION

1. Field of the Invention

The present invention relates to a collision-detecting device for use in an automotive vehicle, and especially to such a device including a deformable member disposed in front of a reinforcing member of a bumper for detecting a collision with a pedestrian.

2. Description of Related Art

It has been required to detect a type of an object collided with a vehicle. In particular, it is important to detect whether a collided object is a pedestrian. Devices for protecting a collided pedestrian have been proposed and tested for putting them into actual use. For example, a hood of a vehicle is lifted and/or an airbag for protecting a collided pedestrian is operated. However, it is important to accurately detect that a collided object is a pedestrian, not an object other than a pedestrian, to avoid unnecessary operation of the pedestrian-protecting device. If the pedestrian-protecting device is unnecessarily operated when objects other than a pedestrian collide with the vehicle, such operation may be harmful to a driver or a passenger in the vehicle. For example, the lifted hood may be crushed into a passenger compartment when the vehicle hits a hard object such as a concrete wall or a heavy vehicle.

To detect types of objects collided with a vehicle, WO 2005/098384 and JP-A-2006-117157 propose a bumper device having a deformable member disposed in front of a bumper-reinforcing member. A pressure change, due to a collision, in an inner space of the deformable member is detected thereby to detect types of a collided object. Further, the deformable member functions as a cushion for protecting legs of a collided pedestrian. The types of collided objects are detected based on a pressure change in the inner space of the deformable member that is proportional to its volume change caused by a collision. In the conventional device, however, there is a problem that the deformable member may not be designed to properly protect the legs of the collided pedestrian.

SUMMARY OF THE INVENTION

The present invention has been made in view of the above-mentioned problem, and an object of the present invention is to provide an improved collision-detecting device having a deformable member that is able to detect, types of collided objects and to properly protect a leg portion of a collided pedestrian.

The collision-detecting device of the present invention includes a deformable member having an inside space, a pressure sensor disposed in the inside space and an electronic control unit connected to the pressure sensor. The deformable member is formed in an elongated shape and disposed in a bumper of an automotive vehicle. The pressure sensor disposed in the inside space of the deformable member detects a pressure change caused when the vehicle collides with objects including a pedestrian. The electronic control unit determines whether the vehicle collides with a pedestrian or other objects based on an amount of the pressure change detected by the pressure sensor. Such determination may be made based on the pressure change and a vehicle speed. When it is determined that the vehicle hits a pedestrian, a device for protecting a pedestrian such as airbag or a hood-lifting device is operated under control of the electronic control unit.

A width (W) of the deformable member is made to sufficiently cover a crush-width, i.e., a portion of the deformable member that is usually deformed by a collision with a pedestrian. Since it is found that the crush-width is 200 mm, the width (W) of the deformable member is made 300 mm or wider. A height (h) of the deformable member is set so that a reaction force (F) of the deformable member due to the pressure change in the inside space of the deformable member caused by a collision with a pedestrian does not exceed a predetermined level. The predetermined level may be set to 1 kN to protect a leg portion of a colliding pedestrian. The reaction force (F) may be calculated according to the formula: $F=[\{W/(W-0.2)\}^{1.4} \times 100 - 100] \times 0.1 \times h$, where W and h are in meter. The deformable member may be divided into two portions in its width direction.

Since the width of the deformable member is made 300 mm or wider, a collision with a pedestrian is surely detected. Since the height of the deformable member is made so that the reaction force caused by a collision with a pedestrian does not exceed an allowable level, the pedestrian is protected from a severe damage. Other objects and features of the present invention will become more readily apparent from a better understanding of the preferred embodiment described below with reference to the following drawings.

DETAILED DESCRIPTION OF THE PREFERRED EMBODIMENT

Figure 1:
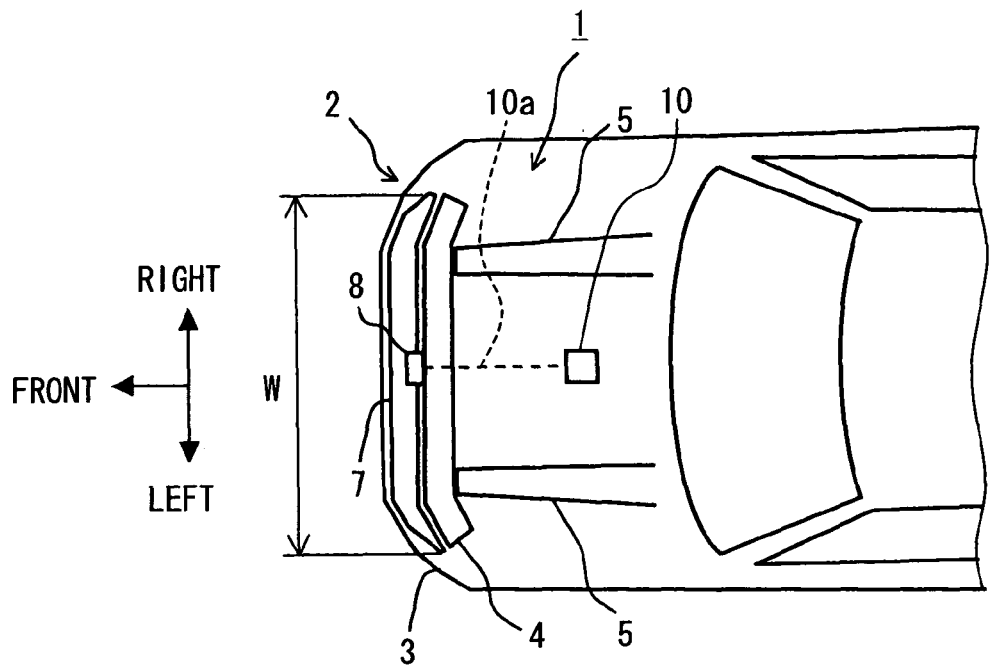
FIG. 1 is a plan view showing, in a transparent manner, a collision-detecting device according to the present invention mounted on an automotive vehicle.
Figure 2:
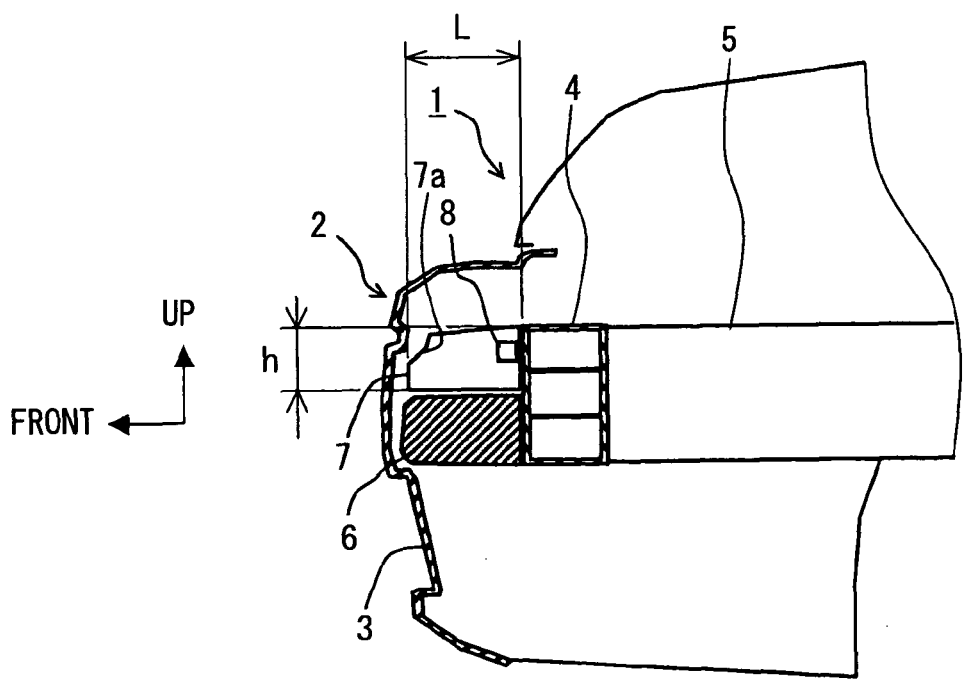
FIG. 2 is a cross-sectional side view showing the collision-detecting device shown in FIG. 1.
Figure 3:
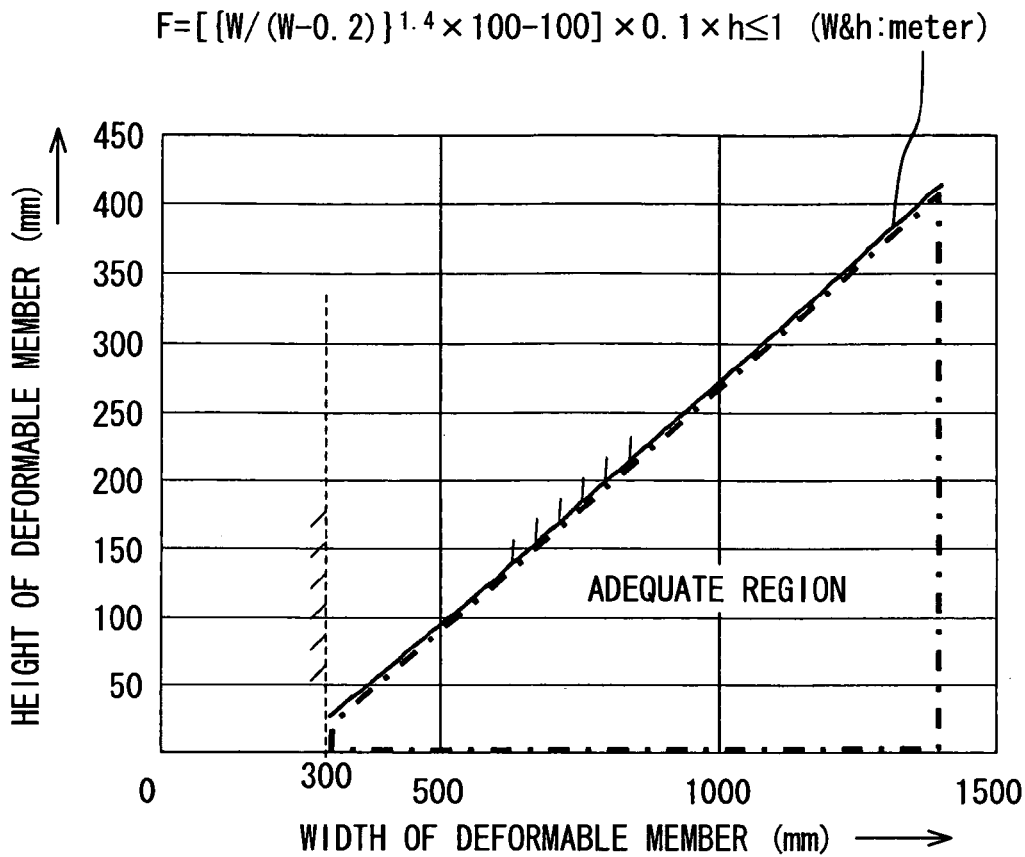
FIG. 3 is a graph showing a height of a deformable member, used in the device shown in FIG. 1, relative to its width and an adequate region providing a proper protection of a pedestrian.

A preferred embodiment of the present invention will be described with reference to FIGS. 1-3. As shown in FIGS. 1 and 2, a collision-detecting device 1 is mainly composed of a deformable member 7 disposed in a bumper 2, a pressure sensor 8 disposed in an inside space 7a of the deformable member 7 and an electronic control unit 10 (referred to as an ECU) for controlling operation of a pedestrian-protecting device. The bumper 2 includes a bumper cover 3, a reinforcing member 4, side members 5, an absorber 6 and the deformable member 7.

The bumper cover 3 is made of a material such as polypropylene and is disposed at a front portion of a vehicle to cover the deformable member 7, the absorber 6 and the reinforcing member 4. The reinforcing member 4 is a beam-like member extending in the width direction of the vehicle for reinforcing the bumper 2. The reinforcing member 4 is made of a metallic material and is connected to a pair of side members 5. The side members 5 made of a metallic material extend in the front-to-rear direction of the vehicle and are connected to both end portions of the reinforcing member 4. The absorber 6 is made of a material such as foamed plastic resin and extends in the width direction of the vehicle. The absorber 6 is disposed underneath the deformable member 7 and in front of the reinforcing member 4. The absorber 6 absorbs a collision impact.

The deformable member 7 is made of a synthetic resin material and has an inside space 7a enclosed by walls having a thickness of several millimeters. The deformable member 7 extending in the width direction of the vehicle is disposed on the absorber 6 and in front of the reinforcing member 4. The deformable member 7 performs both functions, propagation of a pressure change caused by a collision and absorption of a collision impact.

The pressure sensor 8 for detecting a pressure in the inside space 7a of the deformable member 7 is installed in the inside space 7a. The pressure sensor 8 outputs analog signals proportional to pressure in the inside space 7a, and the signals are sent to the ECU 10 through a signal wire 10a. The ECU 10 determines whether a pedestrian collides with the vehicle based on signals sent from the pressure sensor 8. Preferably, signals representing speed of the vehicle are inputted to the ECU 10, and types of objects colliding with the vehicle are determined based on both signals, i.e., the signals representing the pressure in the inside space 7a and the vehicle speed. When the ECU 10 detects a collision with a pedestrian, a pedestrian protecting device such as a hood-lifting device is operated.

Now, proper dimensions of the deformable member 7 will be described. A length L (FIG. 2) of the deformable member 7 in the front-to-rear direction has to be set to a certain length to properly absorb a collision impact. However, it cannot be too long so that the deformable member 7 is properly mounted inside the bumper cover 3. Also, the length L is set to a proper length according to a size of a vehicle. For example, L is set to 40-50 mm. A width W (FIG. 1) of the deformable member 7 has to be set to sufficiently cover a crush-width, a portion of the deformable member 6 that is deformed or crushed by collision with a pedestrian. It has been found that the crush-width is about 200 mm according to tests. Therefore, it is preferable to set W to a level that sufficiently covers the crush-width. For example, W is set to 300 mm or wider. In this particular embodiment, W is set to 1400 mm that is about the same as a width of the reinforcing member 4 because the deformable member 7 is positioned in front of the reinforcing member 4 in parallel thereto.

A height h (FIG. 2) of the deformable member 7 is set to such a level that a reaction force caused by a pressure change in the inside space 7a upon a collision with a pedestrian does not exceed an allowable level for protecting a leg portion of the colliding pedestrian. The allowable level of the reaction force is determined as 1 kN (one kilo Newton) according to the collision tests. Therefore, it is preferable to set the height h to such a level that the reaction force does not exceed 1 kN.

More concretely, the height h is set to satisfy the following formula:

$$F = [\{W/(W-0.2)\}^{1.4} \times 100 - 100] \times 0.1 \times h \leq 1,$$

where F is the reaction force, W is the width of the deformable member 7 in meter and h is the height of the deformable member 7 in meter. The term $\{W/(W-0.2)\}$ in the above formula represents a volume change ratio in the inside space 7a when the crush width of the deformable member is 0.2 m (i.e., 200 mm). The term $\{W/(W-0.2)\}^{1.4} \times 100$ represents a pressure in the inside space 7a after a collision. 100 in this term means an atmospheric pressure of 100 kPa (kilo Pascal). An amount of pressure increase due to a collision is calculated by reducing the atmospheric pressure 100 kPa from the term $\{W/(W-0.2)\}^{1.4} \times 100$. Therefore, the term $[\{W/(W-0.2)\}^{1.4} \times 100 - 100]$ represents an amount of pressure increase in the inside space 7a due to the collision. A width of the deformable member 7, where the reaction force is generated by the collision, is calculated as a half of the crush-width, 0.2 m (i.e., 200 mm). Therefore, the term (0.1× h) represents an area where the reaction force is generated. Accordingly, F is the reaction force generated by the collision. By setting the height h to satisfy the above formula, the reaction force imposed on the colliding pedestrian can be made lower than the permissible level, 1 kN. FIG. 3 shows a region made by the width W and the height h that satisfy the above formula. A triangular-like region within dotted lines is the region in which the width W and the height h can be chosen.

Since the width W of the deformable member 7 is set to a dimension much larger than the crush width (200 mm) in the foregoing embodiment, a collision of a vehicle with a pedestrian is surely detected by the pressure sensor 8 based on a pressure change in the inside space 7a. Since the height h of the deformable member 7 is set to such a dimension that does not generate the reaction force exceeding the allowable level (i.e., 1 kN), a leg portion of a pedestrian is not hit by the reaction force exceeding the allowable level.

Figure 4:
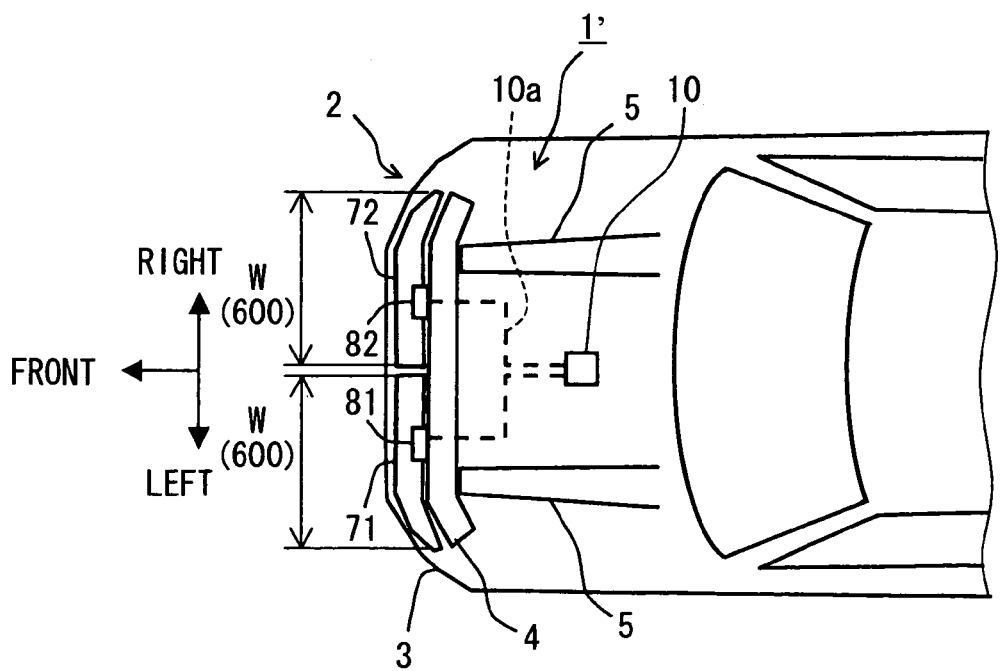
FIG. 4 is a plan view showing, in a transparent manner, a collision-detecting device as a modified example of the device shown in FIG. 1.
Figure 5:
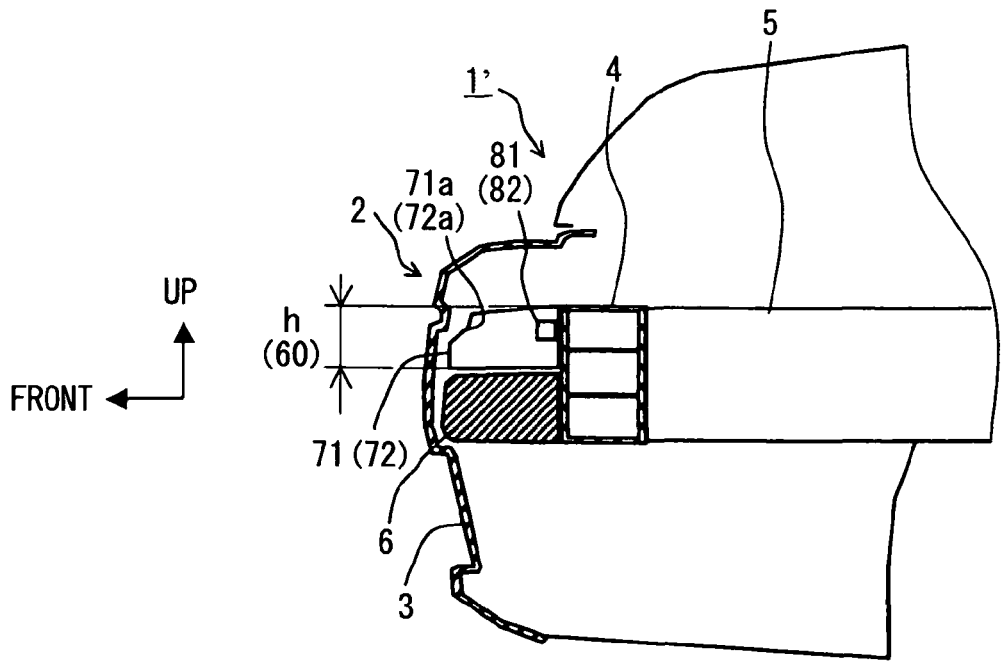
FIG. 5 is a cross-sectional side view showing the modified example shown in FIG. 4.
Figure 6:
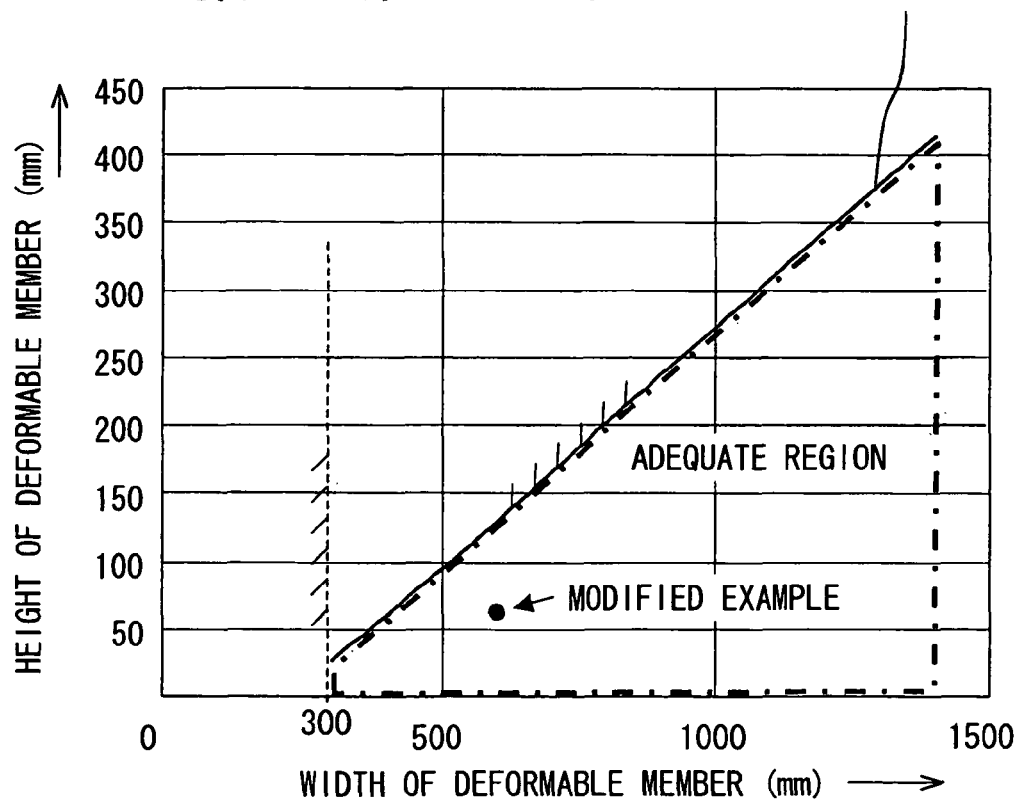
FIG. 6 is a graph showing a height of a deformable member, used in the modified example shown in FIG. 4, relative to its width and an adequate region providing a proper protection of a pedestrian.

The present invention is not limited to the embodiment described above, but it may be variously modified. For example, the deformable member 7 may be divided into two portions 71 and 72 as shown in a modified example shown in FIGS. 4 and 5. The collision-detecting device 1' of this modified example is composed of a pair of deformable members 71, 72, a pair of pressure sensors 81, 82, each disposed in each deformable member, and an electronic control unit 10 connected to each pressure sensor. The width of each deformable member 71, 72 is set to 600 mm which is sufficiently wider than the crush width. The height h of each deformable member 71, 72 is set to 60 mm. The width W and the height h fall in the adequate triangular-like region shown in FIG. 3. The dimensions (W=600 mm, h=60 mm) of the deformable members 71, 72 used in the modified example are shown by a solid dot in FIG. 6. A collision with the pedestrian is surely detected and the reaction force does not exceed the allowable level in the modified example, too.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A collision-detecting device for an automotive vehicle comprising:

a deformable member forming an inside space therein, the deformable member being disposed in a bumper of the automotive vehicle;

a pressure sensor detecting a pressure change in the inside space of the deformable member; and means for detecting that a pedestrian collides with the bumper based on the pressure change detected by the pressure sensor, wherein:

a width (W) of the deformable member is larger than a crush-width to be caused on the deformable member by a collision with the pedestrian; and a height (h) of the deformable member is set, so that a reaction force (F) of the deformable member due to the pressure change in the inside space of the deformable member caused by the collision with the pedestrian does not exceed a predetermined level.

2. The collision-detecting device as in claim 1, wherein the width (W) of the deformable member is equal to or wider than 300 mm, and the predetermined level of the reaction force (F) is 1 kN (one kilo Newton).

3. The collision-detecting device as in claim 1, wherein the deformable member is divided into two portions in its width direction, and each portion is made to meet the width (W) and the height (h).

4. A collision-detecting device for an automotive vehicle comprising:

a deformable member forming an inside space therein, the deformable member being disposed in a bumper of the automotive vehicle;

a pressure sensor detecting a pressure change in the inside space of the deformable member; and means for detecting that a pedestrian collides with the bumper based on the pressure change detected by the pressure sensor, wherein:

a width (W) of the deformable member is larger than a crush-width to be caused on the deformable member by a collision with the pedestrian; and a height (h) of the deformable member is set, so that a reaction force (F) of the deformable member due to the pressure change in the inside space of the deformable member caused by the collision with the pedestrian does not exceed a predetermined level; wherein the width (W) and the height (h) of the deformable member are made to satisfy the following formula:

$$F = [\{W/(W-0.2)\}^{1.4} \times 100 - 100] \times 0.1 \times h \leq 1,$$

where F is the reaction force in kN, and the width (W) and the height (h) are in meter.

5. A collision-detecting device for an automotive vehicle comprising:

a deformable member forming an inside space therein, the deformable member being disposed in a bumper of the automotive vehicle;

a pressure sensor for detecting a pressure change in the inside space of the deformable member; and means for detecting that a pedestrian collides with the bumper based on the pressure change detected by the pressure sensor, and an absorber that is disposed on a side of the deformable member in front of a bumper reinforcing member, the absorber absorbing a collision impact, wherein a width (W) of the deformable member is larger than a crush-width to be caused on the deformable member by a collision with a pedestrian; and a height (h) of the deformable member is set, so that a reaction force (F) of the deformable member due to the pressure change in the inside space of the deformable member caused by a collision with a pedestrian does not exceed a predetermined level.

6. The collision-detecting device as in claim 5, wherein the width (W) of the deformable member is equal to or wider than 300 mm, and the predetermined level of the reaction force (F) is 1 kN (one kilo Newton).

7. The collision-detecting device as in claim 6, wherein the width (W) and the height (h) of the deformable member are made to satisfy the following formula:

$$F = [\{W/(W-0.2)\}^{1.4} \times 100 - 100] \times 0.1 \times h \leq 1,$$

where F is the reaction force in kN, and the width (W) and the height (h) are in meter.

8. The collision-detecting device as in claim 5, wherein the deformable member is divided into two portions in its width direction, and each portion is made to meet the width (W) and the height (h).

\* \* \* \* \*